Sept. 12, 1967  R. W. CROZIER  3,340,908
BOTTOM HEAD YOKE TILTABLE ROTARY SAW
Filed March 1, 1965  3 Sheets-Sheet 1

Roy W. Crozier
INVENTOR.

Sept. 12, 1967   R. W. CROZIER   3,340,908
BOTTOM HEAD YOKE TILTABLE ROTARY SAW
Filed March 1, 1965   3 Sheets-Sheet 2
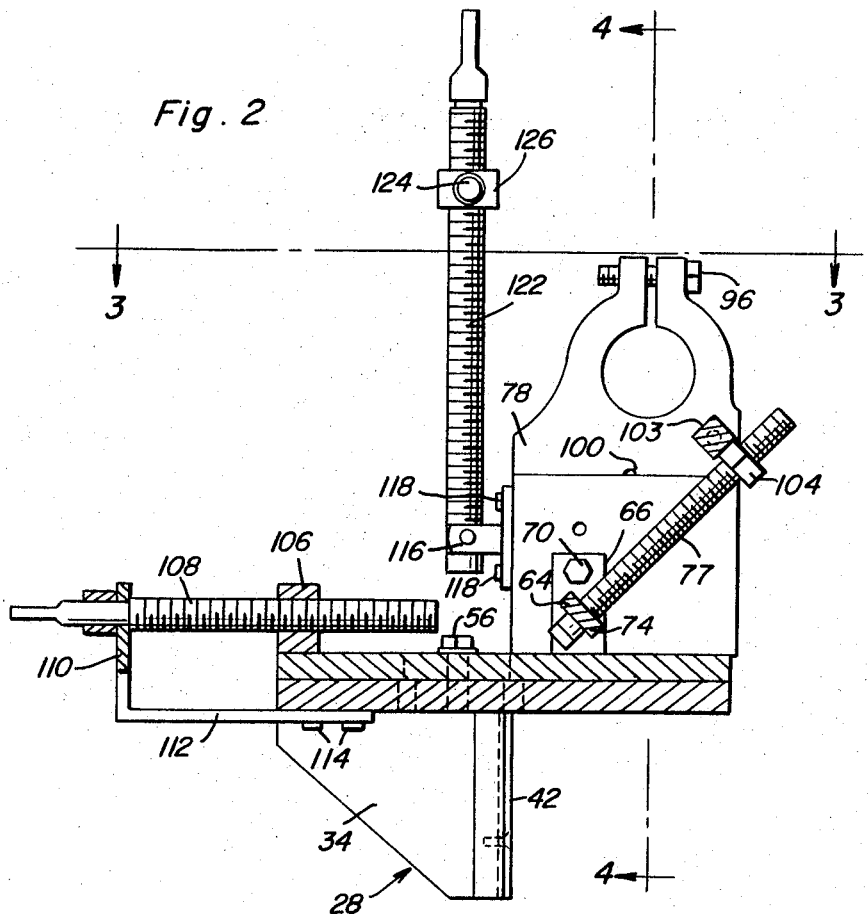
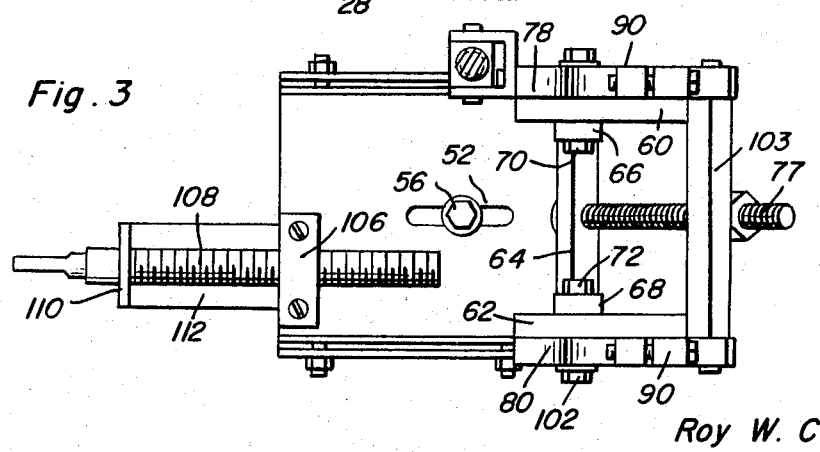
Roy W. Crozier
INVENTOR.

Sept. 12, 1967   R. W. CROZIER   3,340,908
BOTTOM HEAD YOKE TILTABLE ROTARY SAW
Filed March 1, 1965   3 Sheets-Sheet 3
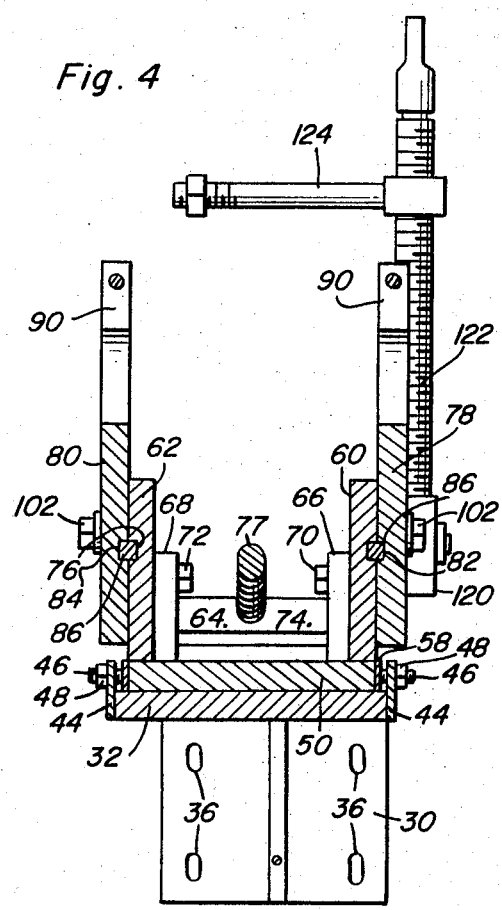
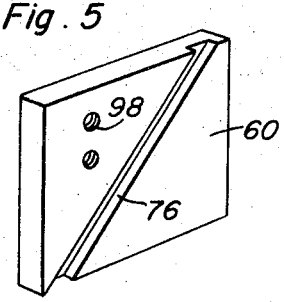
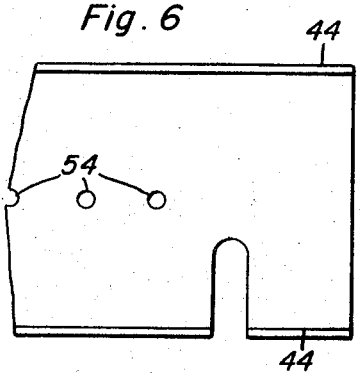
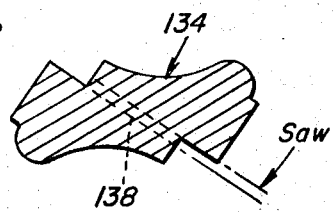
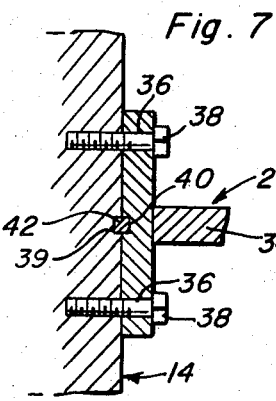
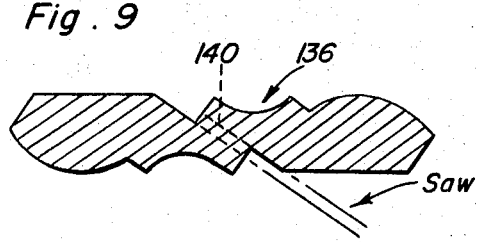
Roy W. Crozier
INVENTOR.
BY *James A. O'Brien*
*and Harvey B. Jacobson*
Attorneys United States Patent Office 3,340,908
Patented Sept. 12, 1967

3,340,908
BOTTOM HEAD YOKE TILTABLE ROTARY SAW
Roy W. Crozier, Albuquerque, N. Mex., assignor to Forest Products Company, a corporation of Nevada
Filed Mar. 1, 1965, Ser. No. 435,934
4 Claims. (Cl. 143—36)

ABSTRACT OF THE DISCLOSURE

A rotary saw assembly including a mounting bracket for mounting a tiltable rotary saw adjustably on a molding machine to saw a finished double molding strip into two single molding strips. The saw assembly is adjustable in a horizontal plane, in an inclined vertical plane and angularly about a horizontal axis. Adjustment of the saw assembly about a horizontal axis alters the axis of rotation of a circular saw forming part of the assembly and thus alters the plane of rotation of the saw. Adjustment of the saw assembly in an inclined vertical plane provides for adjustment of the plane of rotation of the saw along the path defined by the inclined vertical path of adjustment and the horizontal adjustment enables adjustment of the plane of the saw in a horizontal path.

---

This invention relates to a novel and useful bottom head yoke tiltable rotary saw mounting bracket and more specifically to a tiltable rotary saw mounting bracket specifically adapted to be mounted on a molding machine similar to the Diehl 5-head Model 605–B Molder manufactured by the G. M. Diehl Machine Works, Inc., Wabash, Ind. Five-head molders of this type include five molding heads for successively shaping the bottom, top, inside, outside and bottom portions of a strip of lumber being molded thereby.

Five-head molding machines are a relatively recent development in that most molding machines heretofore have been provided with only four cutting heads for molding the top, inside, outside and bottom portions of a strip of lumber being handled thereby. The addition of a fifth molding head, which additional head precedes the the other four in the direction of movement of the workpieces through the machines, enables the machine to plane the undersurface of a strip of lumber being fed into the machine thereby eliminating the necessity to pre-surface rough material. By planing the undersurface of the strips of rough material being fed into the machine a smooth flat surface is afforded along the bottom of the strip of lumber for guiding engagement with the bed of the machine.

Although the bottom head yoke tiltable rotary saw mounting bracket of the instant invention has been primarily designed for the above mentioned five-head molding machines, it is to be appreciated that it may also be utilized to great advantage on molding machines having less than five molding heads. As will be hereinafter more fully set forth, the bottom head yoke tiltable rotary saw mounting bracket of the instant invention is designed to be mounted upon the bottom head yoke of the last bottom molder in lieu of the conventional bottom molder head supported therefrom. The tiltable rotary saw mounting bracket and rotary saw supported therefrom comprising the complete assembly of the instant invention is adapted to saw a finished double molding strip into the two desired single molding strips after the double strip has been molded by the preceding four heads of the associated molder and in a manner whereby the only material removed from the double molding strip to form the two desired single molding strips is that material removed as a result of the cut formed in the double molding strip by the rotary saw supported from the bracket of the instant invention. In this manner, with the first bottom head yoke supporting a molder head instead of a planing head adapted to form a first planar lower surface on the strip of lumber being handled by the associated molding machine, the preceding four molding heads of the machine may mold the bottom, top, inside and outside portions of the double molding strip prior to the rotary saw supported by the tiltable bracket of the instant invention cutting the finished double molding strip into the two desired individual molding strips.

Because of the various angulated surfaces on various types of molding strips it is possible to closely position patterns of the cross-sectional outlines of two molding strips on the end edge of a strip of lumber to be molded in a manner such that the two ultimately desired molding strips have opposing planar surfaces and may be simultaneously cut apart along these planar surfaces from the single preshaped double molding strip by forming a single narrow kerf through the double molding strip between the planar surfaces of the two individual strips. By this method, two molding strips may be cut from the same double strip of lumber with less waste in lumber than would occur if the same two molding strips were molded from two separate strips of lumber having the smallest possible cross-sectional area. As an example, if substantially right triangular molding strips are desired, substantially one-half of a square strip of lumber fed into the molding machine to form a single molding strip from a single strip of lumber is wasted. However, a piece of square stock may be cut into a pair of triangular molding strips merely by forming a narrow kerf longitudinally through the square stock extending diagonally through the stock as it emerges from the associated molding machine. In this manner, the only material that is lost in forming two triangular molding strips from a single piece of square stock is that material necessary to plane the four longitudinal sides of the square stock and that small amount of material removed by the formation of a thin diagonal kerf through the stock as it emerges from the molding machine. The waste by simultaneously forming two molding strips in this instance is therefore reduced to an extent whereby almost double the amount of molding strips may be formed from the same amount of stock. Savings of this type in the lumber industry would be highly desirable to substantially all manufacturers engaged in the production of molding strips.

It is the main object of this invention to provide a multi-head molder with a high speed, narrow kerf forming rotary saw mounted in a manner such that the plane in which the rotary saw rotates may be readily angularly displaced relative to the bed of the associated molding machine so as to enable the associated molding machine to form double molding strips and simultaneously cut the double molding strips into a pair of single molding strips as the double molding strip emerges from the molding machine.

Another object of this invention is to provide a rotary saw mounting bracket for use on a multi-head molding machine and adapted to tiltably support a rotary saw and also support the rotary saw for horizontal and vertical adjustment transversely of the bed of the associated molding machine.

Yet another object of this invention is to provide a rotary saw mounting bracket constructed in a manner so as to be adapted to be readily mounted on a five-head molding machine in lieu of the second bottom molding head thereof.

A final object of this invention to be specifically enumerated herein is to provide a mounting bracket for tiltably supporting a rotary saw on a molding machine and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary vertical sectional view taken upon a plane passing through portions of a conventional form of molding machine shown with the rotary saw mounting bracket of the instant invention mounted on the second bottom head yoke of the molding machine and supporting a rotary saw therefrom in a manner whereby the rotary saw may be angularly displaced relative to the bed of the molding machine and laterally adjusted both horizontally and vertically relative to the bed of the molding machine;

FIGURE 2 is a side elevational view of the mounting bracket of the instant invention as seen from the back of FIGURE 1 and with portions thereof being broken away and shown in vertical transverse section;

FIGURE 3 is a horizontal sectional view taken substantially upon a plane indicated by section line 3—3 of FIGURE 2;

FIGURE 4 is a vertical sectional view taken substantially upon a plane indicated by section line 4—4 of FIGURE 2;

FIGURE 5 is a perspective view of one of the guide plates of the mounting bracket;

FIGURE 6 is a fragmentary top plan view of the horizontal flange of the mounting base for the mounting bracket;

FIGURE 7 is a fragmentary enlarged horizontal sectional view taken substantially upon a plane indicated by section line 7—7 of FIGURE 1;

FIGURES 8 and 9 are cross-sectional views of two different double molding strips before being sawn apart by the rotary saw which is adapted to be supported from the mounting bracket of the instant invention, the future saw kerf being shown in phantom lines;

Figure 1:
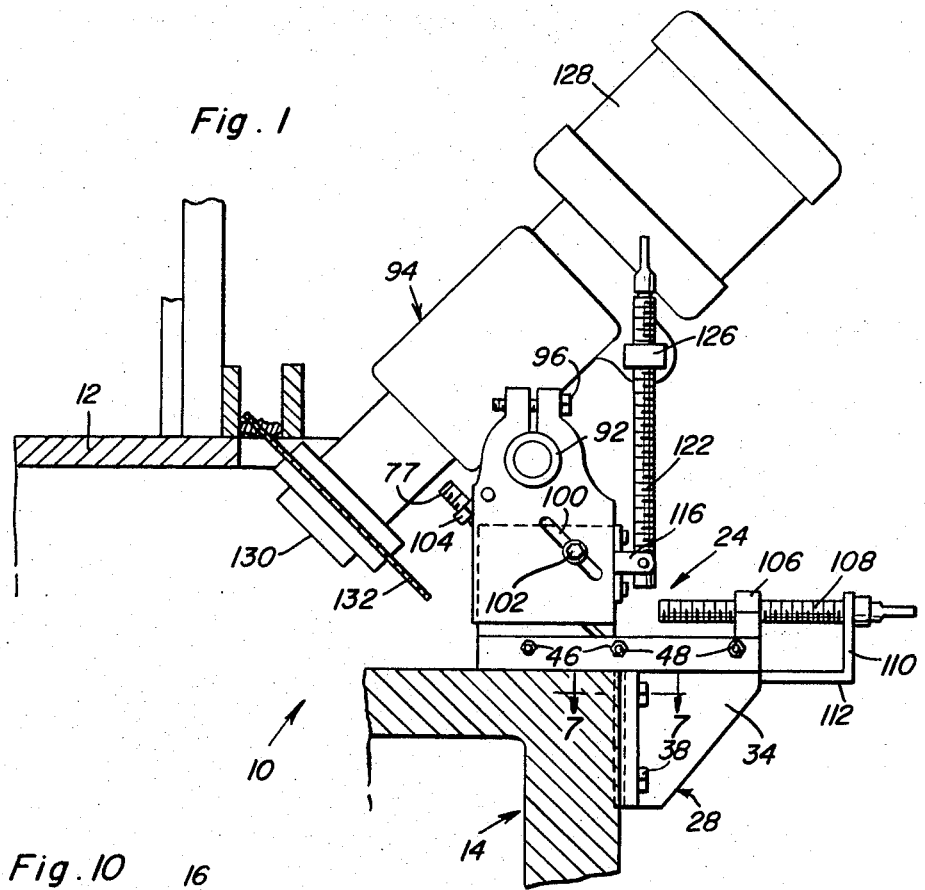
Figure 10:
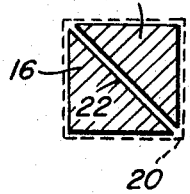
Figure 11:
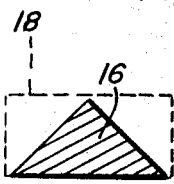

FIGURE 10 is a cross-sectional view of a pair of identical molding strips after having being initially formed from a double piece of square stock and then sawn apart, the original outline of the square stock being shown in phantom lines; and FIGURE 11 is a cross-sectional view of a single molding strip similar to those illustrated in FIGURE 10 and showing the manner in which considerably greater waste which may occur when forming a single molding strip from a single piece of stock opposed to a double molding strip and then sawing the two molding strips apart with a narrow kerf saw.

With attention now directed more specifically to the drawings the numeral 10 generally designates a molding machine such as the aforementioned Diehl 5-head molder including a bed plate 12 and a second bottom head yoke generally referred to by the reference numeral 14. The machine 10 includes five head yokes, a first bottom head yoke, a top yoke, an inside yoke, and an outside yoke (not shown), and the second bottom yoke 14.

Conventionally, specifically dimensioned stock is fed along the bed plate 12 by feed rolls (not shown) and planed by the first bottom head which is supported from the first bottom yoke. This planing action forms a smooth planar lower surface on the stock for proper mating with the upper surface of the bed 12. Then, the stock passes the top, inside, outside and second bottom cutting heads supported from the corresponding yokes at which points the corresponding portions of the stock is shaped. The machine 10 was originally designed to form a single molding strip such as that illustrated at 16 in FIGURE 11 from a piece of stock having an original cross-sectional outline such as that shown in phantom lines in FIGURE 11 of the drawings and designated by the reference numeral 18. It may of course be seen that the irregular shape of the molding strip 16 causes considerable waste of the original piece of stock 18 to occur. However, as shown in FIGURE 10 of the drawings a pair of the molding strips 16 can be formed from a single piece of somewhat larger stock referred to by the reference numeral 20, if the pair of molding strips are properly positioned relative to each other and if a double molding strip may first be formed and then sawn apart by the formation of a thin saw kerf such as that designated by the reference numeral 22 in FIGURE 10 of the drawings. By simultaneously forming two molding strips in a single double molding strip the two strips may obviously be formed with far less waste of the original stock and with only a slight increase in the waste being effected by the saw kerf 22 when sawing the double molding strip into the desired pair of single molding strips.

The rotary saw mounting bracket of the instant invention has been designed specifically to transform the aforementioned five-head molding machines into machines which may simultaneously form two molding strips by first forming a double molding strip of the type illustrated in FIGURE 10 of the drawings and then cutting the double molding strip into the pair of single molding strips desired by cutting the narrow kerf 22 as the double molding strip leaves the molding machine.

The rotary saw mounting bracket of the instant invention is generally designated by the reference numeral 24 and is mounted on the second bottom head yoke 14 in lieu of the second bottom head (not shown) which has been removed to provide room for the rotary saw mounting bracket. When the rotary saw mounting bracket 24 is installed, it then becomes necessary to provide some means for shaping the bottom of the stock being fed through the molding machine inasmuch as the second bottom head which usually performs this function has been removed. Accordingly, the first bottom head, which conventionally merely forms a flat planar lower surface on the molding strip for mating with the bed 12 of the molder 10, is changed so as to be adapted to form the proper bottom surface on the desired molding strip whether the desired molding strip includes a planar lower surface such as the lower surface of the molding strip 16 illustrated in FIGURE 11 or a scalloped undersurface such as the undersurfaces of the double molding strips illustrated in FIGURES 8 and 9. In this manner, a five-head molding machine is modified to form a double molding strip and simultaneously cut the double molding strip into its pair of single molding strip components.

The rotary saw mounting bracket of the instant invention includes a mounting bracket assembly generally referred to by the reference 28 and including a pair of right angulated plates 30 and 32. The plate 30 is substantially vertically disposed and the plate 32 forms a type of crosshead for the upper end of the plate 30 and is secured to the latter, a buttress web 34 being rigidly secured between the plates 30 and 32. The plate 30 is apertured as at 36 in order to receive the threaded fasteners 38 by which the plate 30 is secured to the second bottom head yoke 14. Still further, the second bottom head yoke 14 is provided with a vertical keyway 39 which is registered with a similar vertical keyway 40 formed in the back surface of the plate 30. A key 42 is provided and is received within the keyways 38 and 40 to positively position the plate 30 against angular displacement about an axis disposed normal to its medial plane and relative to the second bottom head yoke 14.

A pair of upstanding sides 44 are secured to the opposite sides of the plate 32 in any convenient manner and the sides 44 are provided with threaded bores (not shown) in which setscrews 46 are threadedly engaged, the setscrews 46 having jam nuts 48 threadedly mounted thereon.

The mounting bracket 24 includes a base plate 50 which is received between the upwardly projecting portions of the sides 44 and which is suitably apertured at points spaced longitudinally therealong as at 52. The plate 32 is provided with a plurality of longitudinally spaced threaded bores 54 and a shank type fastener 56 is passed through the slot 52 and has its externally threaded lower end portion threadedly engaged in one of the bores 54 to retain the base plate 50 on the plate 32. Still further, a pair of thin bearing plates 58 are provided and are disposed along the opposite sides of the base plate 50 so as to bear thereagainst. The remote surfaces of the bearing plates 58 are provided with countersunk blind bores (not shown) for seatingly receiving similarly shaped inner end portions of the setscrews 46. Therefore, it may be seen that the setscrews 46 may be adjusted so as to properly angularly position the base plate relative to the plate 32 about an axis disposed normal to the medial plane of the base plate 50.

A pair of upstanding guide plates 60 and 62 and which are substantially identical, excepting that they are right and left handed plates, are provided and secured to the base plate 50 by means of suitable countersunk fasteners (not shown) secured through the bottom of the base plate 50 and into the lower portions of the guide plates 60 and 62.

A generally H-shaped anchor 64 is secured between the guide plates 60 and 62 and includes a pair of upstanding leg plates 66 and 68 secured to the confronting surfaces of the guide plates 60 and 62 by means of fasteners 70 and 72. The cross member 74 of the anchor 64 rotatably journals the head end of an externally threaded screw 77.

A pair of inclined guideways 76 are formed in the remote surfaces of the guide plates 60 and 62 and a pair of journal plates 78 and 80 are disposed outwardly of the guide plates 60 and 62 and include similar inclined guideways 82 and 84, respectively, formed in their confronting surfaces which register with the guideways 76. A guide bar or key 86 is seated in each pair of confronting guideways 76 and 82 and 84 and therefore slidably mount the upstanding journal plates 78 and 80 on the guide plates 60 and 62. The upper ends of the journal plates 78 and 80 define split clamp portions 90 for rotatably receiving and clampingly engaging a cylindrical support arm 92 carried by a rotary saw assembly generally referred to by the reference numeral 94. The split clamp portions 90 may be opened and closed by means of the threaded fasteners 96 operatively engaged therewith.

Each of the guide plates 60 and 62 has a threaded bore 98 formed in its outer surface and each of the journal plates 78 and 80 has an inclined slot 100 formed therein paralleling the corresponding guideways 76. A suitable threaded fastener 102 is passed through each of the slots 100 and threadedly engaged in the corresponding threaded bore 98. In addition, a cross brace 103 is secured between the journal plates 78 and 80 and includes a laterally projecting central portion 104 defining a threaded bore which threadedly receives the screw 77. Accordingly, it may be seen that the journal plates 78 and 80 may be shifted along an inclined plane extending between and generally paralleling the guideways 76 by rotating the screw 77.

One end of the base plate 50 has an upwardly projecting boss 106 removably secured thereto. The boss 106 has a threaded bore formed therethrough and a screw 108 is threadedly engaged in the threaded bore and journaled at one end in an upstanding flange portion 110 carried by a second base flange portion 112 secured to the plate 32 by means of suitable fasteners 114, see FIGURE 2.

A bifurcated anchor 116 is secured to the journal plate 78 by means of suitable fasteners 118 and has threadedly supported therefrom an internally threaded sleeve portion 120 in which the lower end of a screw member 122 is rotatably journaled. A pivot arm 124 is fixedly supported from the rotary saw assembly 94 and includes an end portion 126 having a threaded bore formed therethrough in which the screw 122 is threadedly received. Accordingly, the rotary saw assembly 94 may be angularly adjustably positioned about the longitudinal axis of the sleeve or cylindrical member 92 by loosening the fastener 77 and rotating the screw 122.

The rotary saw assembly 94 includes a motor 128 which drives a spindle 130 supporting a thin circular saw 132.

In operation, the first four heads of the machine 10 are utilized to contour or mold the bottom, top, inside and outside portions of a double molding strip such as the double molding strips generally referred to by the reference numerals 134 and 136 illustrated in FIGURES 8 and 9, respectively. Then, the second bottom head yoke 14 and the saw mounting bracket 24 are adjusted so as to very accurately position the thin circular saw blade 132 in order that the latter may cut the narrow saw kerfs designated by the reference numerals 138 and 140 illustrated in FIGURES 8 and 9 in order that the double molding strips 134 and 136 each may be cut into the desired two separate single molding strips. As previously set forth, the simultaneous formation of two molding strips in a single double molding strip as illustrated in FIGURE 10 of the drawings and the cutting of the double molding strip into the two separate molding strips 16 illustrated in FIGURE 10 of the drawings enables the two molding strips 16 to be formed from a piece of stock 20 with very little waste as opposed to the relatively great amount of waste which occurs when a single molding strip such as the molding strip 16 illustrated in FIGURE 11 is formed from a piece of stock such as that designated by the reference numeral 18 in FIGURE 11 of the drawings.

Not only does the present invention encompass the provision of an apparatus by which a five head molding machine may be modified so as to simultaneously form two molding strips, but also in the method by which the five head molding machine is modified for this purpose.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a multi-head molder of the type including a generally horizontal longitudinally extending bed along which strips of lumber are adapted to be longitudinally fed and a plurality of molder heads for successively shaping the various sides of a strip of lumber fed longitudinally along said bed, a tiltable rotary saw mounting bracket, said bracket being supported from said molder in lieu of one of the conventional molder heads supported therefrom, a rotary saw assembly including a driven shaft on which a thin circular saw blade is mounted for rotation therewith, said bracket including means mounting said rotary saw assembly therefrom with the axis of rotation extending at generally right angles relative to said bed, said means mounting said saw assembly on said bracket including means for angularly adjusting the axis of rotation of said shaft relative to said bed in a vertical plane, and means for adjustably positioning said saw assembly and angularly adjusting means laterally of the axis of rotation of said shaft and said bed along a line inclined generally 45° relative to the horizontal and generally paralleling said vertical plane, said means mounting said saw assembly on said bracket also including means for adjustably positioning said saw assembly relative to said bed in a generally horizontally disposed plane and along a line generally paralleling said vertical plane.

2. A bracket assembly for adjustalby positioning a rotary saw relative to a material support, said bracket assembly including a base mounted rigidly on said support and including first, second, and third portions adjustly positionable relative to said base, first and second portions, respectively, said first portion being adjustably positionable along a first straight path relative to said base, said second portion being adjustably positionable toward and away from said base along a second straight path inclined approximately 45° relative to said first path and in a plane generally paralleling said first path, and said third portion being adjustably rotatably positionable relative to said second portion about an axis disposed generally normal to said plane, said third portion being adapted to have a rotary saw assembly supported therefrom with the axis of rotation of its rotary saw blade generally paralleling said plane, said base defining elongated first guide means extending along said first path and with which said first portion is guidingly engaged, said first portion including a first pair of generally parallel plates, said plates including one set of corresponding parallel sides including second guide means extending along said second path, said second portion including a second pair of generally parallel plates including a first set of corresponding sides opposing said one set of sides and including means guidingly engaged with said second guide means, second pair of parallel plates including aligned bores in which said third portion is rotatably received, and first and second pairs of screw threadedly engaged portions carried by said base and said first portion and the latter and said second portion, respectively, for effecting adjustment of said first portion relative to said base and said second portion relative to said first portion.

3. The combination as defined in claim 1 wherein said means for mounting said saw assembly adjustably relative to said bed and a generally horizontally disposed plan includes a base plate, a horizontally movable support plate overlying said base plate, said base plate including guide means thereon guidingly engaging the support plate, and screwthreaded means interconnecting the base plate and support plate for adjusting the position of the support plate in relation to the base plate, said means adjustably positioning said saw assembly and angularly adjusting means laterally of the axis of rotation of the shaft along a line inclined generally 45° relative to the horizontal including a pair of upstanding plates rigid with said support plate, each of said upstanding plates having an inclined groove formed in the outer surface thereof, a pair of side plates disposed in face to face contacting engagement with the upstanding plates with the side plates having corresponding diagonal grooves for alignment with the grooves in the upstanding plates, keys disposed in the aligned grooves for guiding movement of the side plates in relation to the upstanding plates, at least one of said side plates having a slot therethrough receiving a fastener extending into one of the upstanding plates for locking the side plates in adjusted position in relation to the upstanding plates with the slot being parallel to the grooves, said means mounting the rotary saw assembly for angular adjustment of the axis of rotation including a clamp structure at the upper end of said side plates defining bearing surfaces, said saw assembly including shaft segments journaled in said bearing surfaces, and a skirt threaded member interconnecting one of the side plates and the rotary saw assembly in spaced relation to the bearing surfaces for tilting the saw assembly in relation to the side plates, at least one of said side plates having a screw-threaded member connected thereto with the other end of the screwthreaded member being connected to one of the upstanding plates with the screwthreaded member being disposed in generally parallel relation to the slots for moving the side plates in relation to the upstanding plates.

4. A circular rotary saw assembly for use on a molding machine comprising a base plate adapted to be supported from a molding machine, a support plate mounted on said base plate, means interconnecting the base plate and support plate for adjustably positioning the support plate in a plane generally paralleling the base plate, laterally extending and substantially parallel plates projecting rigidly from said support plate, a pair of side plates engaging opposed surfaces of said laterally extending plates, guide means interconnecting said side plates and laterally extending plates for guiding relative movement between the side plates and laterally extending plates in an inclined plane in relation to the support plate and in a direction toward and away from the support plate and base plate, means interconnecting said side plates and laterally extending plates for adjustably positioning the side plates in relation to the laterally extending plates, a saw assembly including a saw blade rotatably supported during a cutting operation, said saw assembly including a transversely extending saw arm generally perpendicular to the axis of rotation of the saw blade, means on each of said side plates for journalling the transverse arm of the saw assembly for rotatable movement to enable angular and swinging adjustment of the axis of rotation of the saw blade and the plane of rotation of the saw blade, and means interconnecting said saw assembly and side plates in spaced relation to the axis of engagement between the transverse arm and side plates for pivoting the saw assembly in relation to the side plates about an axis defined by the transverse arm.

References Cited
UNITED STATES PATENTS

| | | | |
|---|---|---|---|
| 96,224 | 10/1869 | Grosvenor | 143—36 X |
| 342,534 | 5/1886 | Perkins. | |
| 788,434 | 4/1905 | Schollenberger | 143—36 |
| 2,814,319 | 11/1957 | Hetman et al. | 143—38 |

DONALD R. SCHRAN, *Primary Examiner.*